US009311248B2

(12) United States Patent
Wagner

(10) Patent No.: US 9,311,248 B2
(45) Date of Patent: Apr. 12, 2016

(54) METHODS AND APPARATUSES FOR MONITORING ACTIVITIES OF VIRTUAL MACHINES

(71) Applicant: Raytheon Company, Waltham, MA (US)

(72) Inventor: John R. Wagner, Melbourne, FL (US)

(73) Assignee: Raytheon Cyber Products, LLC, Herndon, VA (US)

(*) Notice: Subject to any disclaimer, the term of this patent is extended or adjusted under 35 U.S.C. 154(b) by 223 days.

(21) Appl. No.: 13/888,849

(22) Filed: May 7, 2013

(65) Prior Publication Data

US 2013/0297849 A1    Nov. 7, 2013

Related U.S. Application Data

(60) Provisional application No. 61/643,692, filed on May 7, 2012.

(51) Int. Cl.
| G06F 12/00 | (2006.01) |
| G06F 12/10 | (2006.01) |
| G06F 11/36 | (2006.01) |
| G06F 9/455 | (2006.01) |

(52) U.S. Cl.
CPC ............ *G06F 12/10* (2013.01); *G06F 9/45541* (2013.01); *G06F 11/362* (2013.01); *G06F 9/45533* (2013.01); *G06F 12/1009* (2013.01); *G06F 2212/151* (2013.01)

(58) Field of Classification Search
CPC .............................. G06F 12/10; G06F 9/45533
USPC .............................................................. 711/6
See application file for complete search history.

(56) References Cited

U.S. PATENT DOCUMENTS

| 8,464,254 | B1 * | 6/2013 | Vohra et al. .................. 718/1 |
| 8,990,520 | B1 * | 3/2015 | Tang et al. .................... 711/154 |
| 2006/0053492 | A1 | 3/2006 | Wallace |
| 2011/0047543 | A1 * | 2/2011 | Mohinder ....................... 718/1 |
| 2011/0082962 | A1 | 4/2011 | Horovitz et al. |
| 2011/0153909 | A1 * | 6/2011 | Dong ............................ 711/6 |
| 2011/0185417 | A1 | 7/2011 | Zhou et al. |
| 2013/0054895 | A1 * | 2/2013 | Tuch et al. .................... 711/118 |
| 2013/0132690 | A1 * | 5/2013 | Epstein ......................... 711/159 |

OTHER PUBLICATIONS

International Search Report dated Sep. 26, 2013 in connection with International Patent Application No. PCT/US2013/046481, 5 pages.

(Continued)

*Primary Examiner* — Adam M Queler
*Assistant Examiner* — Trang Ta

(57) ABSTRACT

Embodiments of a method and apparatus for monitoring activity on a virtual machine are generally described herein. The activity may be monitored by a first hypervisor and the virtual machine may be controlled by a second hypervisor. In some embodiments, the method includes setting a breakpoint in a kernel function of the virtual machine. The method may further include generating a page fault, responsive to the virtual machine halting execution at the breakpoint, to cause the second hypervisor to page in contents of a memory location accessed by the kernel function. The method may further include inspecting the contents of the memory location to detect activity in the virtual machine.

22 Claims, 4 Drawing Sheets

(56) References Cited

OTHER PUBLICATIONS

Written Opinion of International Searching Authority dated Sep. 26, 2013 in connection with International Patent Application No. PCT/US2013/046481, 7 pages.

Litty, et al.; "Manitou: A Layer-Below Approach to Fighting Malware"; Dept of Computer Science, University of Toronto; Oct. 21, 2006; XP055079350; pp. 6-11.

Specification titled "Secure Cloud Hypervisor Monitor" filed Feb. 19, 2013; U.S. Appl. No. 13/770,664; 19 pages.

Specification titled "Hypervisor-Based Binding of Data to Cloud Environment for Improved Security" filed Dec. 9, 2013; U.S. Appl. No. 14/101,166; 27 pages.

Raytheon Pikewerks Corporation; Second Look; 2013; http//secondlookforensics.com/; 28 pages.

* cited by examiner

METHODS AND APPARATUSES FOR MONITORING ACTIVITIES OF VIRTUAL MACHINES

PRIORITY

This patent application claims the benefit of priority to John Wagner U.S. Provisional Patent Application Ser. No. 61/643,692, titled "TRUSTED VIRTUAL MACHINE INCLUDING HYPERDRIVE AND METHOD," filed on May 7, 2012, which is hereby incorporated by reference herein in its entirety.

TECHNICAL FIELD

Some embodiments relate to nested hypervisors. Some embodiments relate to using a bare-metal hypervisor to detect activity on a virtual machine controlled by a hypervisor nested in the bare-metal hypervisor.

BACKGROUND

The government hosts an increasing number of services in the cloud. Cloud clients may push their own virtual machine images into the cloud and this may have security implications for both clients and service hosts. Because clients control the configuration of the virtual machines, it is not always possible to install monitoring software inside the guest system. Monitoring activity may also be complicated due to the variety of configurations that clients of the cloud system may deploy. Further, cloud system administrators may not trust monitoring systems that they did not themselves develop.

Thus, there is a general need to gain introspection into the virtual machine guest systems of a cloud hypervisor to monitor the guests without modifying the guest system or the cloud hypervisor.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As computing resources continue to progress toward cloud-based solutions, introspection into virtual machines operating in the cloud will become an ever increasing challenge. Achieving introspection becomes more difficult as the complexity and number of processors and hypervisors and the variety of virtual machines supported by host systems grows. Example embodiments may provide methods and apparatuses for monitoring activity on virtual machines without changes to the virtual machines or to the cloud hypervisors controlling the virtual machines.

Figure 1:
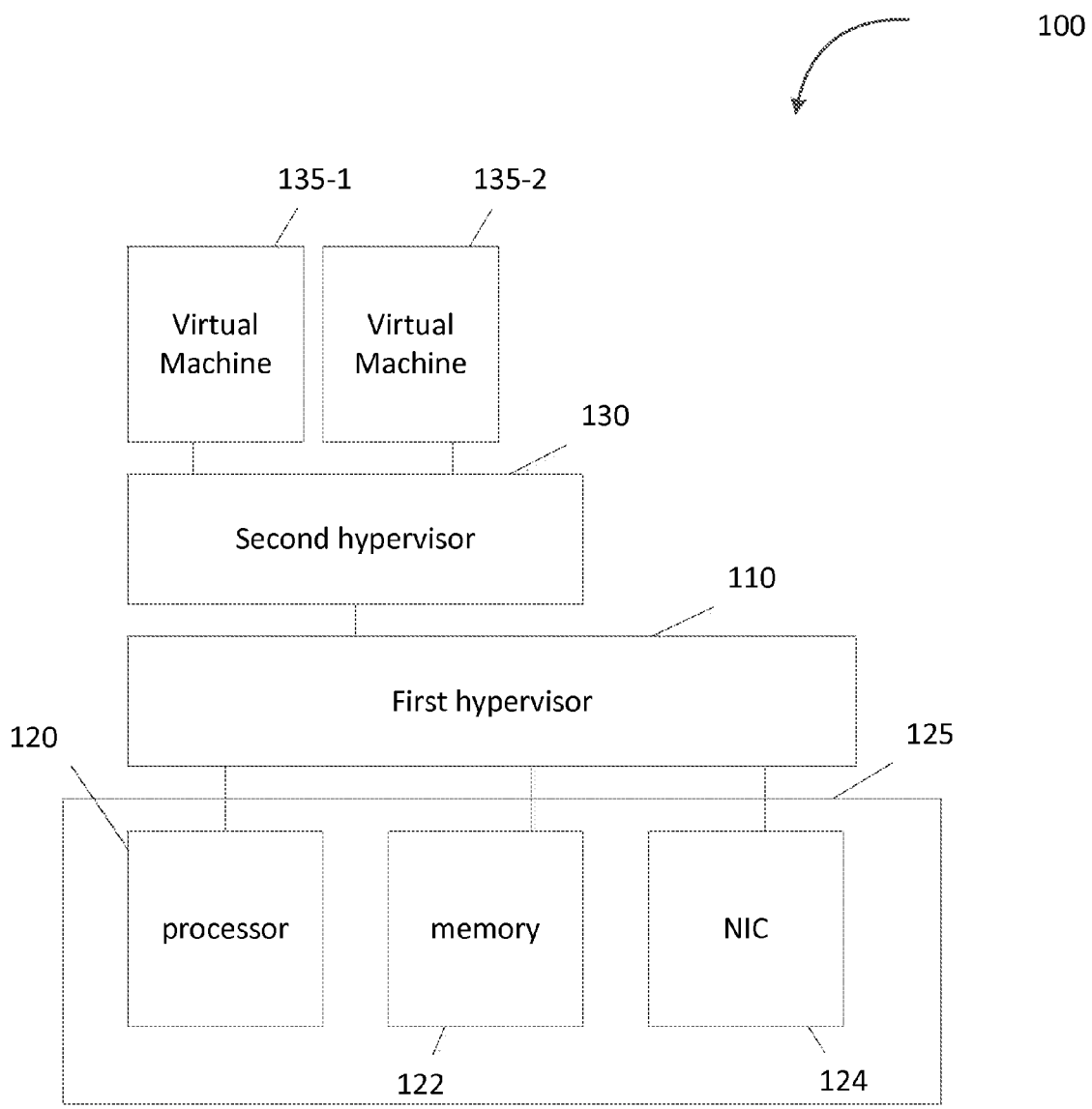
FIG. 1 is a system in accordance with some embodiments.

FIG. 1 is a system 100 in which example embodiments may be implemented. The system may include a first hypervisor 110. The first hypervisor 110 may interact with hardware of a host system 125 such as a processor 120, a memory 122 (e.g., random access memory (RAM), read only memory (ROM), or other computer-readable storage mediums), and a network interface card (NIC) 124. While only a single processor 120 is depicted in the host system 125, multiple processors or multi-core processors may be included in the host system 125. The first hypervisor 110 may be a bare-metal hypervisor. A bare-metal hypervisor may also be referred to as a native hypervisor or as a Type 1 hypervisor. Bare-metal hypervisors run directly on a host's hardware to control the hardware. Non-bare-metal hypervisors, referred to as Type-2 hypervisors, run between the operating system of the host machine and one or more guest operating systems.

The first hypervisor 110 may run a second hypervisor 130 such that the second hypervisor 130 may be said to be "nested" with the first hypervisor 110. The second hypervisor 130 may be a commercially available hypervisor, and the second hypervisor 130 may be referred to as a cloud hypervisor. The second hypervisor may also be a bare-metal hypervisor that is, however, different from the first hypervisor. Examples of commercially available hypervisors may include: XEN available from Citrix Systems, Inc. of Fort Lauderdale, Fla., and ESXi available from VMware of Palo Alto, Calif. Other hypervisors may also be utilized.

The second hypervisor 130 may manage and monitor guest operating systems forming one or more virtual machines 135. One or more operating systems may be utilized on the virtual machines 135. For example, virtual machine 135-1 may utilize a version of MICROSOFT WINDOWS SERVER, and virtual machine 135-2 may utilize a version of LINUX. Other operating systems in various combinations forming any number of virtual machines may be accommodated depending on the performance capabilities of the processor 120 and the hardware of the host system 125.

In example embodiments, the first hypervisor 110 may monitor activity in the virtual machine by setting breakpoints in kernel functions of the virtual machine 135 as described below with respect to FIG. 2. Using extended page table (EPT) manipulation, also described below with respect to FIG. 2, the first hypervisor 110 may cause the second hypervisor 130 to provide memory contents for memory addresses accessed by the kernel functions. The first hypervisor 110 may examine the memory contents in order to monitor activity on the virtual machine 135.

Figure 2:
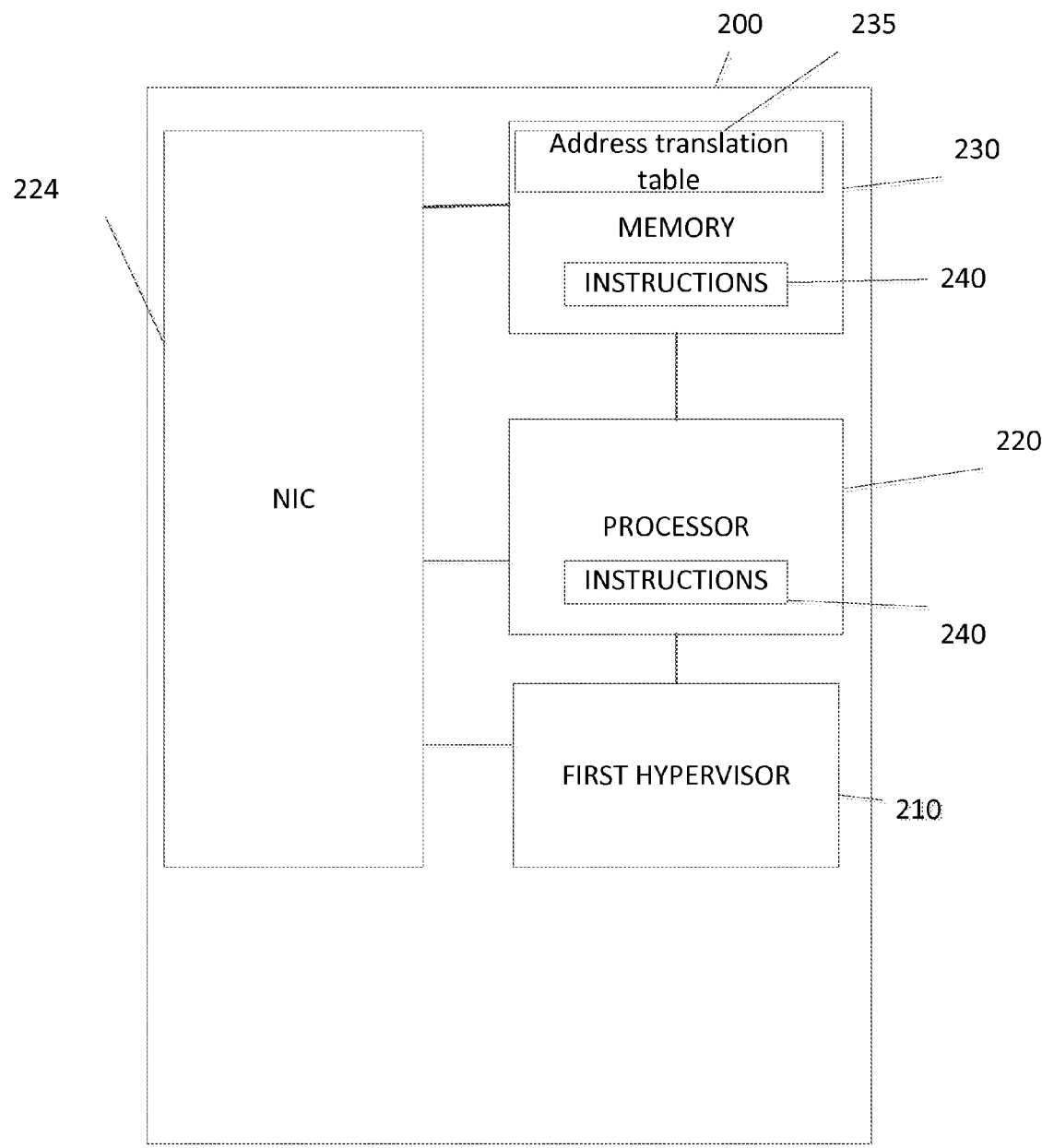
FIG. 2 is a block diagram of a system for implementing procedures in accordance with some embodiments.

FIG. 2 is a block diagram of a computer 200 for implementing methods according to example embodiments.

The computer 200 may include a first hypervisor 210. The first hypervisor 210 may be appropriate for performing the functionalities of the first hypervisor 110 (FIG. 1). The first hypervisor 210 may install itself on the processor 220.

The first hypervisor 210 may set a breakpoint in an address of a kernel function of a virtual machine 135 (FIG. 1). To determine addresses for kernel functions of the virtual machine 135, the first hypervisor 110 may set an operating system (OS) breakpoint on the range of virtual addresses at which the OS may be loaded on the virtual machine 135. Upon halting on the OS breakpoint, the first hypervisor 110 may determine that the address where the OS breakpoint was triggered is the root address of the virtual machine 135's OS kernel.

In some embodiments, the first hypervisor 210 may calculate addresses of kernel functions as offsets from the root address of the OS kernel. In an example embodiment, the first hypervisor 210 may read OS data structures to identify the offset of the kernel function based on the kernel function name. Based on the offset of the kernel function from the root address of the OS kernel, the first hypervisor 210 may determine the starting address of the kernel function. The first hypervisor 110 may set a kernel function breakpoint at the starting address of the kernel function.

The first hypervisor 210 may generate a page fault responsive to the virtual machine 135 halting execution at the kernel function breakpoint. The page fault may cause the second hypervisor 130 to page in contents of a memory location that may be accessed by the kernel function. The first hypervisor 210 may determine this memory location by reading its address from the parameters on the processor stack created when the kernel function was invoked.

The page fault may include an indication of this memory location. The page fault may be an extended page table (EPT) fault, and the page fault may comprise a VMExit command.

The page fault may cause the second hypervisor 130 to exit the virtual machine 135. The page fault may inform the second hypervisor 130 that an entry is missing in the EPT, and that the second hypervisor 130 should fetch memory at the specified memory location to add to the EPT.

Upon fetching the requested memory, the second hypervisor 130 may re-enter the virtual machine 135. Once the first hypervisor 210 receives notification that the second hypervisor 130 has re-entered the virtual machine 135, the first hypervisor 210 may be aware that the requested memory has been paged-in by the processor 120 and is available for the first hypervisor 210 to examine. The first hypervisor 210 may then examine the memory at the memory location to detect activity, in particular suspicious activity. The first hypervisor 210 may determine that a page of memory contents to be inspected has been paged out by the second hypervisor 130. In at least this situation, in example embodiments, the first hypervisor 210 may generate a second page fault to cause the second hypervisor 130 to page in additional memory.

The first hypervisor 210 may be arranged to select a virtual machine 135 from a plurality of virtual machines 135 for monitoring. To monitor a virtual machine 135 of the plurality of virtual machines 135, the first hypervisor 210 may set a breakpoint in the address space of the desired virtual machine 135. The first hypervisor 210 may determine which addresses are mapped to virtual machines 135 by receiving a notification, for example via a VMEnter command, that the second hypervisor 130 has entered into a virtual machine 135. When the second hypervisor 130 enters a virtual machine 135, the notification to the first hypervisor 210 may include a root address, into an address translation table, for the virtual machine 135. The address translation table may be an EPT. The first hypervisor 210 may record the root addresses in the EPT for each of the plurality of virtual machines 135 to identify a desired virtual machine 135 for monitoring. The identification of a virtual machine 135 may be used by the first hypervisor 210 to enable the appropriate kernel function breakpoint for a virtual machine 135 when it is activated by the second hypervisor 130, for example via a VMEnter command.

The computer 200 may include a communication interface 224. The communication interface 224 may be appropriate for performing the functionalities of the NIC 124 (FIG. 1).

The computer 200 may include memory 230. In one embodiment, the memory 220 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data. The processor 220 may cause the memory 230 to page-in contents of memory that were paged-out by the second hypervisor 130, for inspection by the first hypervisor 210.

The computer 200 may include an address translation table 235. The address translation table 235 may reside in memory 230 or in a separate memory storage (not shown in FIG. 2). The address translation table 235 may be, for example, an extended page table (EPT) as described above. The address translation table 235 may map virtual machine 135 addresses to physical memory addresses of the memory 230.

The computer 200 may include computer instructions 240 that, when implemented on the computer 200, cause the computer 200 to implement functionality in accordance with example embodiments. The instructions 240 may be stored on a computer-readable storage device, which may be read and executed by at least one processor 220 to perform the operations described herein. In some embodiments, the instructions 240 are stored on the processor 220 or the memory 230 such that the processor 220 or the memory 230 acts as computer-readable media. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media.

The instructions 240 may, when executed on the computer 200, cause the computer 200 to install a first hypervisor 210 on the computer 200. The first hypervisor may be a bare-metal hypervisor. The instructions may cause the computer 200 to use the first hypervisor 210 to set a breakpoint in a kernel function of a virtual machine 135 (FIG. 1). The virtual machine 135 may be controlled by a second hypervisor 130 (FIG. 1). The second hypervisor 130 may be a bare-metal hypervisor or the second hypervisor may be other than a bare-metal hypervisor.

The instructions 240 may cause the computer 200 to generate a page fault, responsive to the virtual machine 135 halting execution at the breakpoint, to cause the second hypervisor 130 to page in contents of a memory location accessed by the kernel function. The instructions 240 may cause the computer 200 to inspect the contents of the memory location to detect activity in the virtual machine 135.

Figure 3:
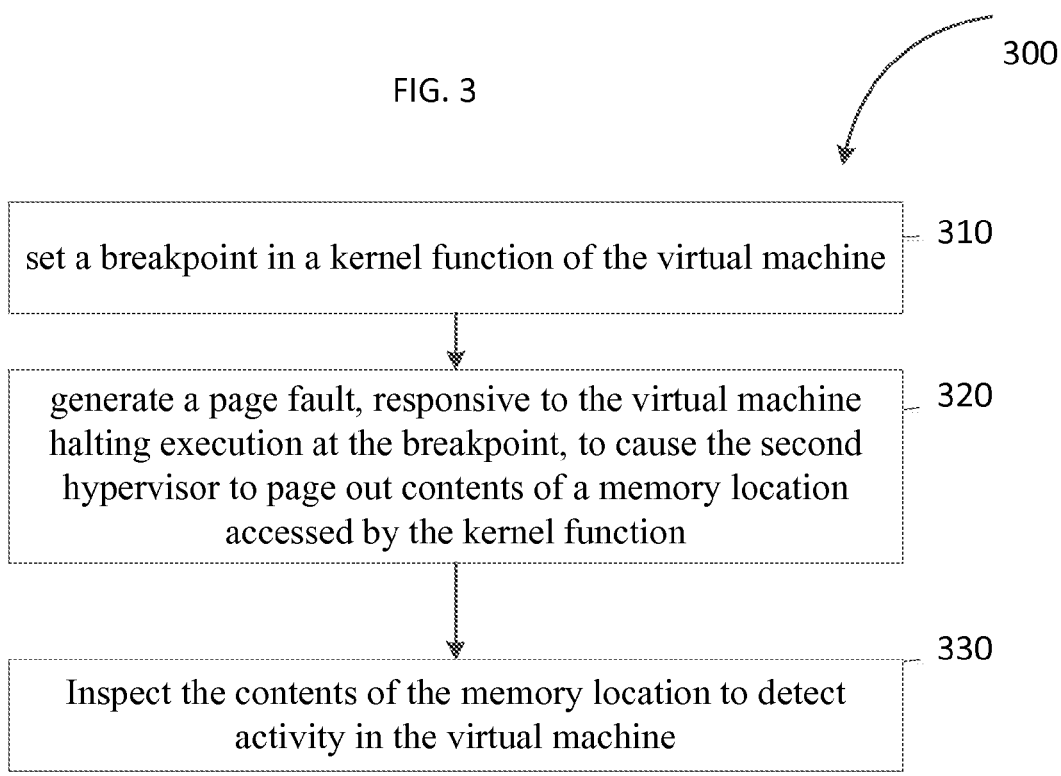
FIG. 3 is a procedure for monitoring activity on a virtual machine in accordance with some embodiments.

FIG. 3 illustrates a procedure 300 for monitoring activity on a virtual machine 135 (FIG. 1). The method may be performed by, for example, the first hypervisor 110 (FIG. 1) or 210 (FIG. 2). The virtual machine 135 may be controlled by a second hypervisor 130 (FIG. 1). The first hypervisor 110 may be of a first type and the second hypervisor 130 may be of a second type. The second type being different from the first type. The first hypervisor 110 may be a bare-metal hypervisor.

In operation 310, the first hypervisor 110 may set a breakpoint in a kernel function of the virtual machine 135. The first hypervisor may determine the address for the breakpoint as described above with respect to FIG. 2. The first hypervisor 110 may select the virtual machine 135 for monitoring from a plurality of virtual machines 135 based on EPT pointers corresponding to each of the plurality of virtual machines.

In operation 320, the first hypervisor 110 may generate a page fault, responsive to the virtual machine 135 halting execution at the breakpoint, to cause the second hypervisor 130 to page in contents of a memory location accessed by the kernel function. The first hypervisor 110 may retrieve a parameter of the kernel function indicating the memory location to be inspected. The first hypervisor 110 may provide the parameter to the second hypervisor 130 during generation of the page fault. The page fault may indicate that an EPT entry is missing. The page fault may include a VMExit command.

In operation 330, the first hypervisor 110 may inspect the contents of the memory location to detect activity in the virtual machine 135. The first hypervisor 110 may determine that a page of memory contents to be inspected has been paged out by the second hypervisor 130, and the first hypervisor 110 may then generate a second page fault to cause the second hypervisor 130 to page in additional memory.

Figure 4:
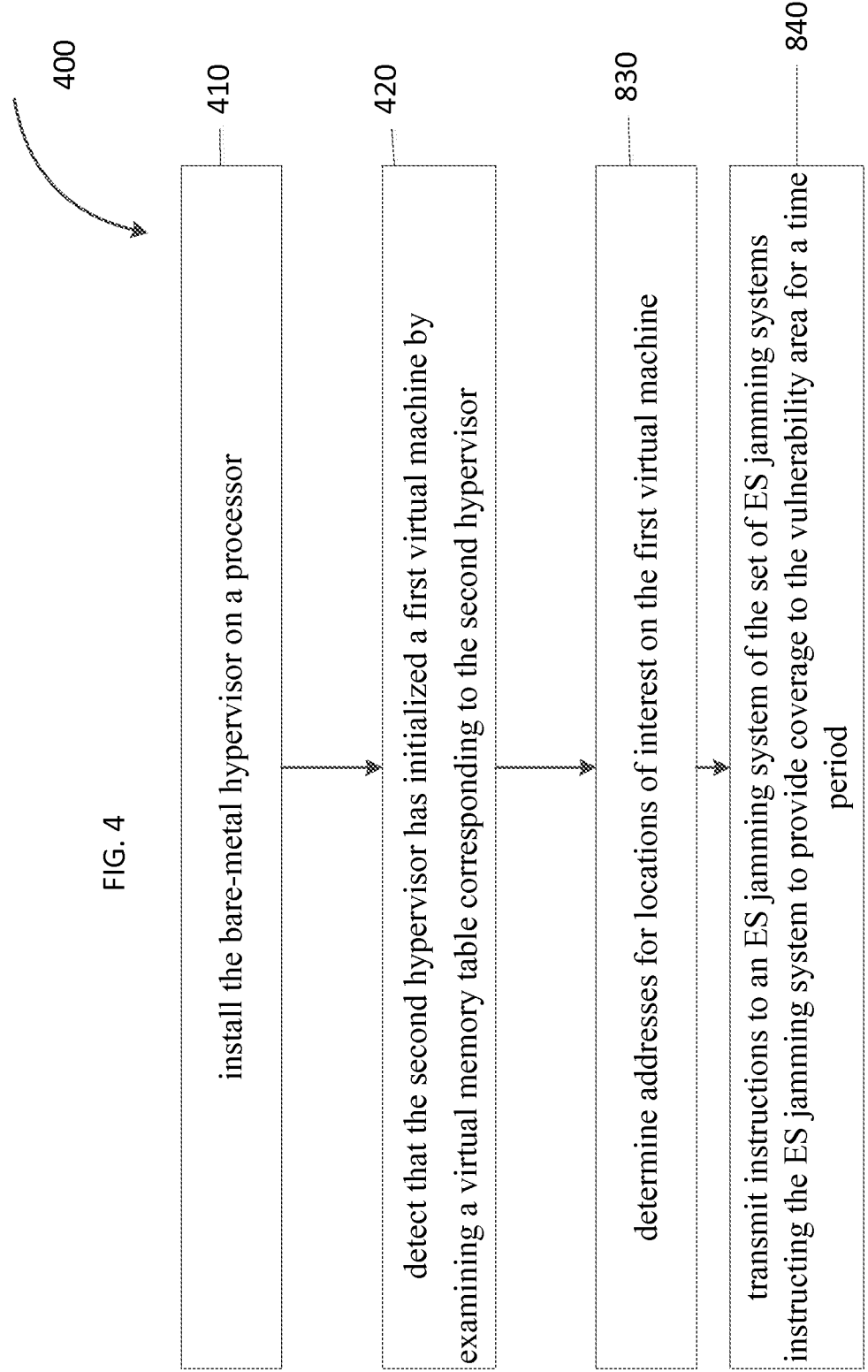
FIG. 4 is a procedure for nesting hypervisors in accordance with some embodiments.

FIG. 4 is a flow chart of a method 400 for nesting a bare-metal hypervisor and a second hypervisor. The bare-metal hypervisor may be appropriate to perform functions of the first hypervisor 110 (FIG. 1) or 210 (FIG. 2) described above. The method 400 may be performed by the first hypervisor 110 or 210. The second hypervisor may be appropriate to perform functions of the second hypervisor 130 (FIG. 1).

In operation 410, the first hypervisor 110 may install itself on a processor 220 (FIG. 2).

In operation 820, the first hypervisor 110 may detect that the second hypervisor 130 has initialized a first virtual machine by examining a virtual memory table corresponding to the second hypervisor 130.

In operation 830, the first hypervisor 110 may determine addresses for locations of interest on the first virtual machine.

In operation 840, the first hypervisor 110 may generate a page fault condition. The page fault condition may indicate that an entry is missing in the virtual memory table. The page fault condition may cause the second hypervisor 130 to provide memory contents for memory at the location of interest. Generating the fault condition may comprise generating a virtual machine exit command. The method 400 may further comprise reading the memory contents responsive to receiving a notification that the second hypervisor 130 has re-entered the virtual machine.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising:
setting, by a first hypervisor, a breakpoint in a kernel function of a virtual machine that is controlled by a second hypervisor;
generating, by the first hypervisor, a page fault responsive to the virtual machine halting execution at the breakpoint to cause the second hypervisor to page in contents of a memory location accessed by the kernel function; and
inspecting, by the first hypervisor, the contents of the memory location to detect activity in the virtual machine;
wherein generating the page fault comprises:
retrieving, by the first hypervisor, a parameter of the kernel function indicating the memory location to be inspected; and
providing, by the first hypervisor, the parameter to the second hypervisor during generation of the page fault.

2. The method of claim 1, further comprising:
accessing an operating system data structure to determine an address of the kernel function at which to set the breakpoint.

3. The method of claim 2, further comprising:
selecting, from a plurality of virtual machines, the virtual machine in which to set the breakpoint based on pointers into an address translation table corresponding to each of the plurality of virtual machines.

4. The method of claim 3, wherein a first of the virtual machines is based on a first operating system and a second of the virtual machines is based on a second operating system.

5. The method of claim 1, further comprising:
determining that a page of memory contents to be inspected has been paged out by the second hypervisor; and
generating a second page fault to cause the second hypervisor to page in additional memory contents responsive to the determining.

6. The method of claim 1, wherein the first hypervisor is of a first type and the second hypervisor is of a second type, the second type being different from the first type.

7. The method of claim 6, wherein the first hypervisor is a bare-metal hypervisor and the second hypervisor is not a bare-metal hypervisor.

8. The method of claim 6, wherein the first hypervisor is a first type of bare-metal hypervisor and the second hypervisor is a second type of bare-metal hypervisor.

9. The method of claim 3, wherein:
the address translation table is an extended page table (EPT), and
the page fault indicates that an EPT entry is missing.

10. The method of claim 9, wherein the page fault includes a VM Exit command.

11. A non-transitory computer-readable medium embodying a computer program, the computer program comprising instructions that, when executed by at least one processor, cause the at least one processor to:
use a first hypervisor to set a breakpoint in a kernel function of a virtual machine that is controlled by a second hypervisor;
use the first hypervisor to generate a page fault responsive to the virtual machine halting execution at the breakpoint to cause the second hypervisor to page in contents of a memory location accessed by the kernel function; and
use the first hypervisor to inspect the contents of the memory location to detect activity in the virtual machine;
wherein the instructions to cause the at least one processor to use the first hypervisor to generate the page fault comprise instructions that cause the at least one processor to use the first hypervisor to:
retrieve a parameter of the kernel function indicating the memory location to be inspected; and
provide the parameter to the second hypervisor during generation of the page fault.

12. The non-transitory computer-readable medium of claim 11, wherein the page fault indicates that an extended page table (EPT) entry is missing.

13. The non-transitory computer-readable medium of claim 11, further comprising instructions that, when executed by the at least one processor, cause the at least one processor to:
select, from a plurality of virtual machines, the virtual machine in which to set the breakpoint based on pointers corresponding to each of the plurality of virtual machines.

14. The non-transitory computer-readable medium of claim 13, wherein a first of the virtual machines is based on a first operating system and a second of the virtual machines is based on a second operating system.

15. The non-transitory computer-readable medium of claim 11, further comprising instructions that, when executed by the at least one processor, cause the at least one processor to:
   determine that a page of memory contents to be inspected has been paged out by the second hypervisor; and
   generate a second page fault to cause the second hypervisor to page in additional memory contents responsive to the determining.

16. An apparatus comprising:
   a first hypervisor configured to:
      set a breakpoint in a kernel function of a virtual machine that is controlled by a second hypervisor;
      retrieve a parameter of the kernel function indicating a memory location to be inspected by the first hypervisor;
      generate a page fault responsive to the virtual machine halting execution at the breakpoint to cause the second hypervisor to page in contents of the memory location; and
      provide the parameter to the second hypervisor during generation of the page fault;
   a memory configured to page-in, for inspection by the first hypervisor, the contents of the memory location that were paged-out by the second hypervisor; and
   an address translation table configured to map virtual machine addresses to physical memory addresses.

17. The apparatus of claim 16, wherein:
   the page fault indicates that an entry is missing in the address translation table, and
   the first hypervisor is further configured to access an operating system data structure to determine an address of the kernel function at which to set the breakpoint.

18. The apparatus of claim 17, wherein:
   the first hypervisor is further configured to select, from a plurality of virtual machines, the virtual machine in which to set the breakpoint based on pointers corresponding to each of the plurality of virtual machines; and
   the page fault is a VM Exit command.

19. The apparatus of claim 17, wherein a first of the virtual machines is based on a first operating system and a second of the virtual machines is based on a second operating system.

20. The apparatus of claim 16, wherein the first hypervisor is further configured to:
   determine that a page of memory contents to be inspected has been paged out by the second hypervisor; and
   generate a second page fault to cause the second hypervisor to page in additional memory contents responsive to the determining.

21. A method comprising:
   installing a first bare-metal hypervisor;
   detecting, by the first bare-metal hypervisor, that a second hypervisor has initialized a virtual machine by examining a virtual memory table corresponding to the second hypervisor;
   determining, by the first bare-metal hypervisor, addresses for locations of interest on the virtual machine; and
   generating a page fault condition to cause the second hypervisor to provide memory contents for memory at the locations of interest, the page fault condition indicating that an entry is missing in the virtual memory table;
   wherein generating the page fault condition comprises:
      retrieving, by the first hypervisor, a parameter of a kernel function indicating a memory location among the locations of interest; and
      providing, by the first hypervisor, the parameter to the second hypervisor during generation of the page fault.

22. The method of claim 21, wherein generating the page fault condition comprises generating a virtual machine exit command, and wherein the method further comprises reading the memory contents responsive to receiving a notification that the second hypervisor has re-entered the virtual machine.

* * * * *